(12) United States Patent
Sayana et al.

(10) Patent No.: US 8,478,190 B2
(45) Date of Patent: Jul. 2, 2013

(54) MULTI-CELL COORDINATED TRANSMISSIONS IN WIRELESS COMMUNICATION NETWORK

(75) Inventors: Krishna Kamal Sayana, Arlington Heights, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 247 days.

(21) Appl. No.: 13/099,177

(22) Filed: May 2, 2011

(65) Prior Publication Data
US 2012/0281556 A1 Nov. 8, 2012

(51) Int. Cl.
*H04B 3/36* (2006.01)
(52) U.S. Cl.
USPC .............................................. 455/7
(58) Field of Classification Search
USPC .............. 370/310, 315, 316, 317, 318; 455/7, 455/11.1, 12.1, 13.4
See application file for complete search history.

(56) References Cited

U.S. PATENT DOCUMENTS

| | | | |
|---|---|---|---|
| 5,781,861 A | 7/1998 | Kang et al. | |
| 6,088,335 A | 7/2000 | I et al. | |
| 7,711,385 B2 | 5/2010 | Ostman et al. | |
| 2007/0249363 A1 | 10/2007 | Amalfitano et al. | |
| 2009/0196245 A1 | 8/2009 | Ji | |
| 2009/0291640 A1 | 11/2009 | Bhattad et al. | |
| 2010/0085884 A1 | 4/2010 | Srinivasan et al. | |
| 2010/0238879 A1* | 9/2010 | Jeon et al. | 370/329 |
| 2010/0291940 A1* | 11/2010 | Koo et al. | 455/450 |
| 2010/0311349 A1 | 12/2010 | Koo et al. | |
| 2010/0331030 A1 | 12/2010 | Nory et al. | |
| 2011/0170435 A1 | 7/2011 | Kim et al. | |
| 2011/0170496 A1 | 7/2011 | Fong et al. | |
| 2012/0281555 A1* | 11/2012 | Gao et al. | 370/252 |

FOREIGN PATENT DOCUMENTS

| | | |
|---|---|---|
| WO | 2007040456 A2 | 4/2007 |
| WO | 201007999 A2 | 7/2010 |
| WO | 2010103898 A1 | 9/2010 |
| WO | 2011139201 A1 | 11/2011 |

OTHER PUBLICATIONS

United States Patent and Trademark Office, "Non-Final Office Action" for U.S. Appl. No. 12/916,871 dated Oct. 18, 2012, 12 pages.
3GPP TSG RAN WG1 #60bis, R1-101981 "Enhanced ICIC and Resource-Specific CQI Measurement" Huawei, Beijing, China, Apr. 12-16, 2010, 5 pages.

(Continued)

*Primary Examiner* — Chi H. Pham
*Assistant Examiner* — Fan Ng

(57) ABSTRACT

A method is described for fast coordinated transmissions in a multi-point system, which involves a UE receiving known pilot signals sent from a set of transmission antennas and determining, based on the known pilot signals from the set of transmission antennas, a recommended first subset of transmission antennas from which transmissions are not intended for the wireless communication device, and a recommended second subset of transmission antennas from which transmissions are intended for the wireless communication device. The UE also determines a recommended transmission power setting of each of the first subset of transmission antennas; sending information to the base station, wherein the information pertains to the recommended first and second subsets of transmission antennas and the recommended transmission power setting of each of the first subset of transmission antennas.

13 Claims, 10 Drawing Sheets

OTHER PUBLICATIONS

3GPP TSG RAN WG1 #60bis, R1-102353 "Measurements and feedback extensions for improved operations in HetNets", Qualcomm Incorporated, Beijing, China, Apr. 12-16, 2010, 3 pages.

3GPP ETSI TS 136 213 V10.1.0 (Apr. 2011) Technical Specification LTE, Evolved Universal Terrestrial Radio Access (E-UTRA); Physical layer procedures (3GPP TS 36.213 version 10.1.0 Release 10), 117 pages.

Krishnamurthy et al., "Interference Coordination in Heterogeneous Networks Using Wireless Terminals as Relays" U.S. Appl. No. 12/916,871, filed Nov. 1, 2010, 27 pages.

Qualcomm Europe: "Signaling for spatial coordination in DL CoMP", 3GPP TSG-RAN WG1 #58, R1-093141, Aug. 24-28, 2009, Shenzhen, China, all pages.

Motorola: "EUTRA Uplink Macro-diversity", 3GPP TSG RAN WG1 #42, R1-050717, London, U.K., Aug. 29-Sep. 2, 2005, all pages.

NTT DOCOMO: "Downlink Interference Coordination Between eNodeB and Home eNodeB", TSG-RAN Working Group 4 (Radio) meeting #52, R4-093203, Shenzhen, Aug. 24-28, 2009, all pages.

Institute for Information Industry (III), Coiler Corporation: "Interference mitigation for HeNBs by channel measurements", 3GPP TSG RAN WG4 Meeting #52, R4-093196, Shenzhen, China, Aug. 24-28, 2009, all pages.

CMCC: "Downlink interference coordination between HeNBs", 3GPP TSG-RAN WG4 Meeting #52, R4-092872, Shenzhen, China, Aug. 24-28, 2009, all pages.

Patent Cooperation Treaty, "PCT Search Report and Written Opinion of the International Searching Authority" for International Application No. PCT/US2010/055261 Feb. 22, 2011, 13 pages.

3GPP TSG RAN WG1 #56bis, R1-091442 "UL Interference Control in the Absence of X2 for Re19" Qualcomm Europe, Seoul, Korea, Mar. 23-27, 2009, 6 pages.

3GPP TSG RAN WG1 #50bis, R1-074444 "On Inter-cell Interference Coordination Schemes without/with Traffic Load Indication" Ericsson, Shanghai, China, Oct. 8-12, 2007, 6 pages.

Patent Cooperation Treaty, "PCT Search Report and Written Opinion of the International Searching Authority" for International Application No. PCT/US2012/034650 Jun. 14, 2012, 11 pages.

* cited by examiner

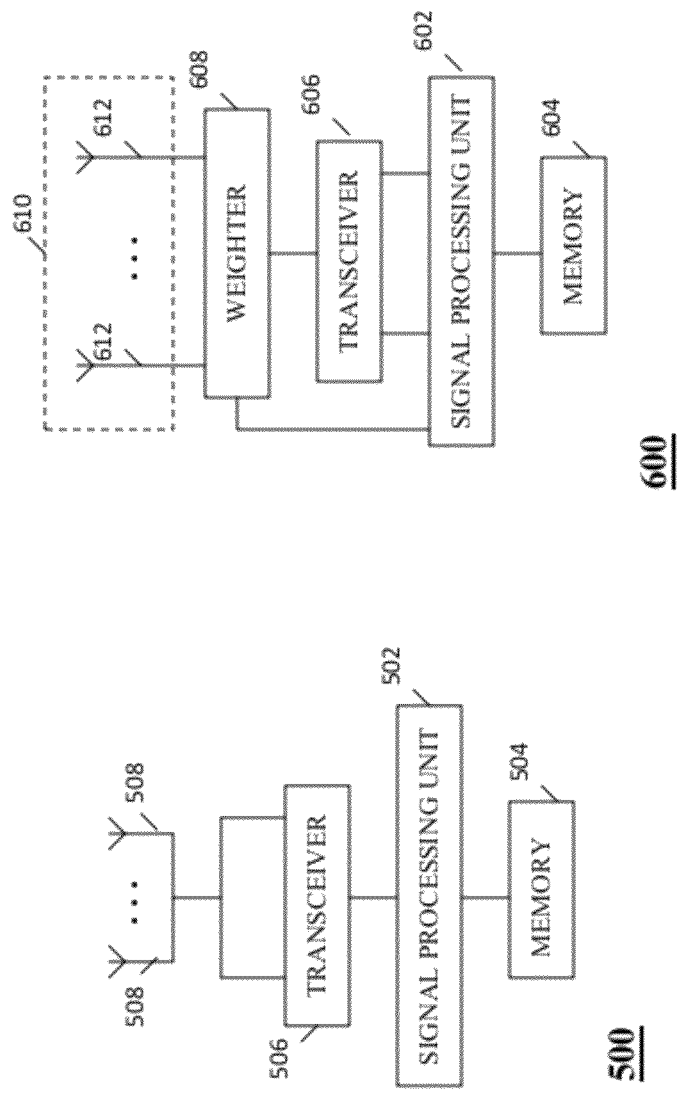

MULTI-CELL COORDINATED TRANSMISSIONS IN WIRELESS COMMUNICATION NETWORK

FIELD OF THE DISCLOSURE

The present disclosure relates generally to wireless communications and, more particularly, to multi-point fast coordinated transmission in an Orthogonal Frequency Division Multiplexing (OFDM) communication system.

BACKGROUND

Coordinated Multi-Point (CoMP) transmission/reception has been proposed as a promising technology to meet the Third Generation Partnership Project (3GPP) Long Term Evolution Advanced (LTE-A) requirements by improving performance of cell-edge UEs in particular. In CoMP operation, multiple transmission/reception points cooperatively transmit to or receive from one or more user equipment (UEs) to improve performance, especially for those UEs that would otherwise, in the case of downlink, see significant interference from some transmission points if they do not cooperate. A transmission point (TP), termed from the downlink perspective, refers to generally a radio unit controlled by the scheduler in a base station (referred to as eNodeB or eNB in LTE). A base station may control a single TP, in which case the TP is the same as a base station or an eNB. In this case, the CoMP operation refers to the case that there is coordination among eNBs. In another network architecture, a base station or eNB may control multiple TPs that are often referred to as radio units or radio heads. In this case, coordination among TPs will happen naturally, and is easier to achieve since they are controlled by a centralized scheduler within the eNB.

In some network deployments, TPs may be co-located, in which case it is feasible to connect them to a single eNB. An example is the well-known three-sector deployment where a single eNB has three service areas referred to as sectors or cells. In some other deployments, TPs may be geographically separated, in which case they can be controlled by either separate eNBs or a single eNB. In the former case, TPs are also typically under the control of separated schedulers that may coordinate in a peer-to-peer fashion. Different types of eNBs with different transmission powers constitutes the so-called heterogeneous network. In the latter case, the TPs, often referred to as remote radio units (RRUs) or remote radio heads (RRHs), connect to a single eNB via optical fiber and a centralized scheduler controls/coordinates all the TPs.

Each TP, co-located or geographically separated, may form its own logical cell or multiple TPs may form a single logical cell. From a user equipment (UE) perspective, a cell is defined as a logical entity that a UE receives data from and transmits data to, in other words, "serves" the UE. The cell that serves a UE is called the "serving cell". The geographic area covered the logical entity is sometimes also referred to as a cell, such as when a cell-edge UE is mentioned to describe a UE located at the edge of the coverage area. A cell usually has an associated cell identifier (cell-ID). A cell-ID is typically used to specify the pilot signals (also referred to as reference signals) and scramble the data transmitted to the UEs "attached" to (i.e., served by) that cell.

At a high level, two general CoMP categories can be used to describe coordination schemes. First, two or more TPs can jointly transmit to a user in the so-called Joint Transmission (JT) scheme. JT schemes turn otherwise interference into constructive signal for the UE, while also achieve the spatial multiplexing gains due to a larger set of antennas. Second, in the so-called Coordinated Scheduling (CS) approach, two or more cells can coordinate dynamically such that their transmission such that the cross interference is reduced when they serve multiple UEs simultaneously. One simple CS example is called Dynamic Cell Selection (DCS) where the best cell for transmission is selected dynamically on a short-term basis. Further muting of the transmission from some cells to completely avoid interference will further improve SNR at the user. In another example referred to as Coordinated Beamforming (CoBF), the spatial domain of the multi-antenna channels is exploited by eNB to choose spatial precoding or beamforming weights appropriately at both serving and non-serving cells.

There are pros and cons for JT and CS, which take different approaches to interference management. For example, JT requires dynamic exchange of data among all the participating TPs, which may be feasible only to architectures that have a centralized scheduler with fiber-based connection to TPs. For CoBF, one of the drawbacks of relying exclusively on spatial domain interference mitigation is that the performance improvement may be limited by the accuracy of spatial channel feedback. This is often the case where the uplink constraint limits the feedback to be quantized codebook based feedback.

DCS requires dynamic coordination among cells, even though it does not need to exchange a lot of data as in JT. Traditionally, cells are connected through a standardized higher latency interface referred to as X2, which is not designed to enable dynamic coordinate on a short-term basis. The information exchanged over X2 is often coarse and based on long-term channel characteristics and traffic loads etc, hence only a slow coordination among distributed schedulers is possible. As an example of coordination, each cell may adopt an associated subframe muting pattern according to pre-planning or slow coordination.

CoMP operation via fast coordinated scheduling is of particular interest to the network architecture where a centralized scheduler controls multiple TPs via fiber based connection.

In conventional non-CoMP operation, a single TP, which is the serving cell for a number of UEs, adapts the transmission parameters based on the quality of the links to those UEs. To support link adaptation, a technique commonly adopted in modern wireless communications, a UE needs to estimate the channel quality of a hypothetical data transmission which is traditionally from a single cell. Channel quality is often represented as a modulation and coding scheme (MCS). The UE may also feed back some recommendation on the spatial transmission parameters, such as the transmission rank indication, precoding matrix index, and the like.

In CoMP operation, transmission from multiple points also needs to adapt to the link condition as seen by the UE. The key to realize fast scheduling gains is for each individual TP to respond to the traffic loading and user channel and interference condition dynamically with adaptive resource allocation, user selections, muting and power management. CoMP needs to be enabled by appropriate UE feedback which also should reflect the performance improvement resulted from CoMP.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

FIG. 5 is a block diagram of a user equipment of the communication system of FIG. 1.

FIG. 6 is a block diagram of a base station of the communication system of FIG. 1.

DETAILED DESCRIPTION

The disclosure generally encompasses methods that involve a wireless communication device receiving known pilot signals sent from a set of transmission antennas. The wireless communication device determines, based on the known pilot signals from the set of transmission antennas, a recommended first subset of transmission antennas from which transmissions are not intended for the wireless communication device. The device determines a second subset of transmission antennas from which transmissions are intended for the wireless communication device. The wireless communication device also determines a recommended transmission power setting of each of the first subset of transmission antennas, wherein the wireless communication device sends information to the base station. The information pertains to the first and second subsets of transmission antennas and the recommended transmission power setting of each of the first subset of transmission antennas.

Figure 1:
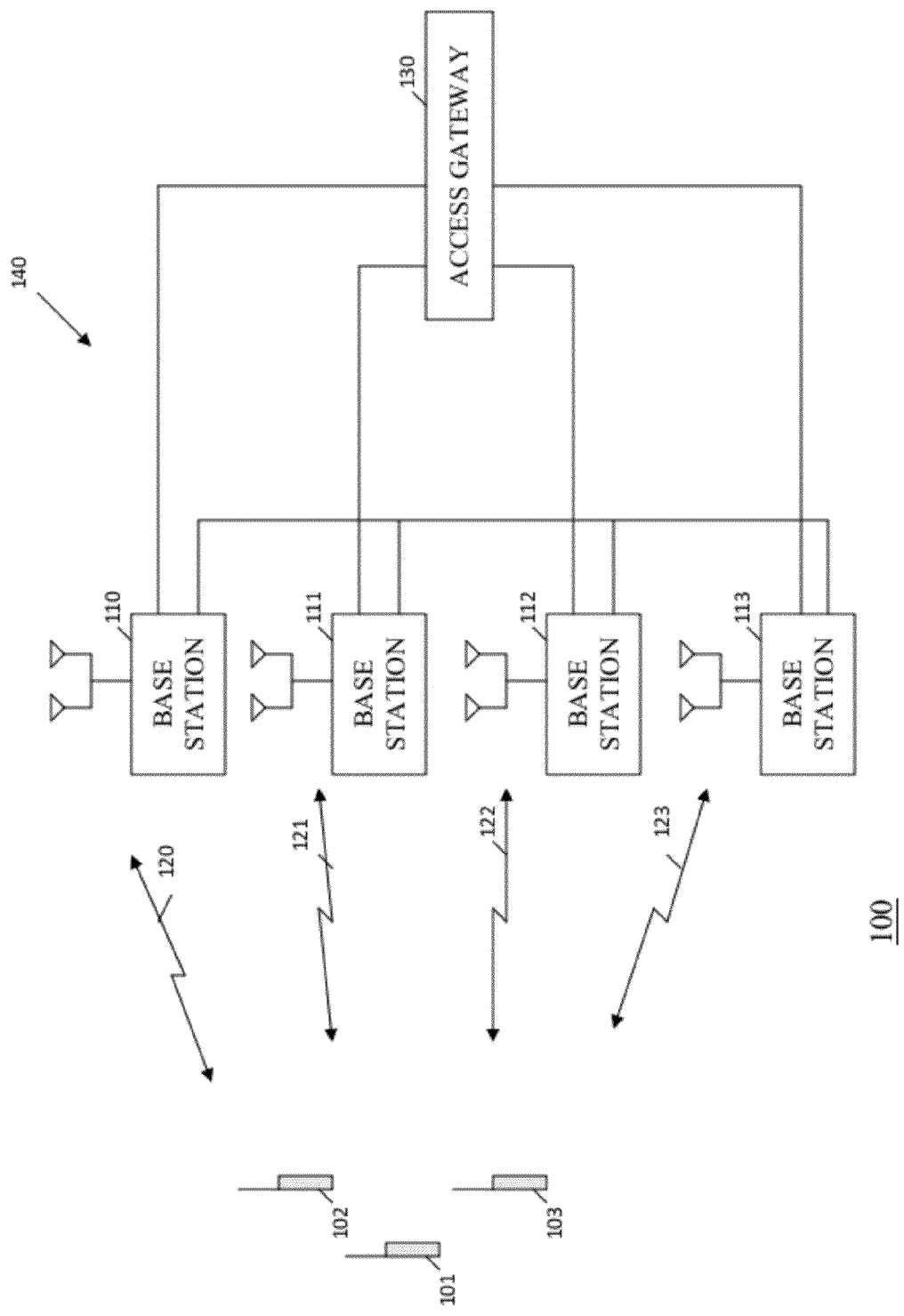
FIG. 1 is a block diagram of a wireless communication system.

FIG. 1 is a block diagram of a wireless communication system 100 including multiple user equipment (UE) 101-103 (three shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes an access network 140 comprising multiple base stations (BSs) 110-113 (four shown), such as a Node B, an eNodeB, an Access Point (AP), or a Base Transceiver Station (BTS) (the terms BS, eNodeB, eNB, and NodeB are used interchangeably herein), that includes an antenna array comprising multiple antennas and that supports Multiple-Input Multiple-Output (MIMO) communications and that each provides communication services, via a corresponding air interface 120-123, to users' equipment, such as UE 101-103.

Each BS provides communication services to UEs in a geographic area referred to as a cell or a sector of a cell. Note that a single BS can cover multiple sectors of a cell. The term "cell" is typically used to refer to a sector in this case. More precisely, from a UE perspective, a cell is a logical entity that a UE communicates with (i.e., serves a UE). The cell that serves a UE is called the "serving cell" as opposed to a "non-serving" or potentially interfering cell. A cell usually corresponds to an associated cell identifier (cell-ID). A cell-ID is typically used to specify the pilot signals (also referred to as reference signals) and to scramble the data transmitted to the UEs "attached" to (i.e., served by) that cell. Each cell can have a single transmission point (TP) in which case the term cell and TP can used interchangeably. Each cell may have multiple TPs (refer to FIG. 2) in which case they are not equivalent.

Each air interface 120-123 comprises a respective downlink and a respective uplink. Each of the downlinks and uplinks comprises multiple physical communication channels including multiple control/signaling channels and multiple traffic channels. Each BS of the multiple BSs 110-113 is in communication with the other BSs of the multiple BSs via one or more of a network access gateway 130 and an inter-BS interface that may comprise one or more of a wire-line link and a wireless link of all of the BSs and via which each BS may broadcast to the other BSs. Access network 140 further includes an access network gateway 130. Access network gateway 130 provides access for each of BSs 110-113 to other parts of an infrastructure of communication system 100 and to each other, and may be, for example but not limited to, any one or more of a Radio Network Controller (RNC), a mobile switching center (MSC), a Packet Data Service Node (PDSN), or a media gateway.

Figure 2:
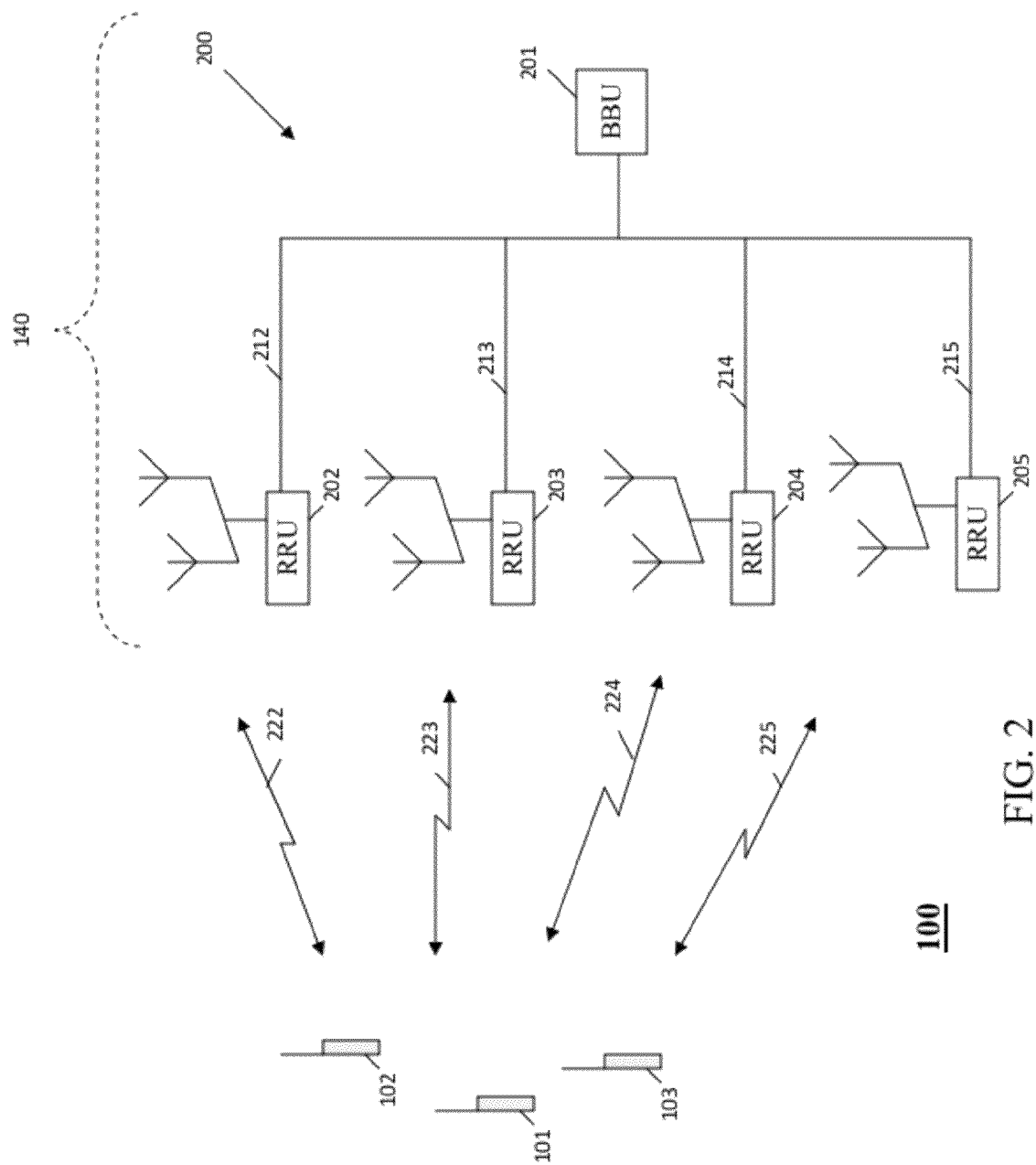
FIG. 2 is a block diagram of a wireless communication system.

FIG. 2 illustrates a block diagram an access network 140 including a BS 200 whose functionality is distributed among a Base Band Unit (BBU) 201 and multiple Remote Radio Units (RRUs) 202-205 (four shown) coupled to the BBU. Each RRU 202-205 comprises an antenna array that includes one or more antennas and further includes other functionality, and is responsible for receiving and transmitting the radio frequency signals from and to a UE, such as UE 101, residing in a coverage area of the RRU via a corresponding air interface 222-225. Each RRU 202-205 can also each be referred to as a TP that is connected to the same BS 200. Each air interface 222-225 comprises a respective downlink and a respective uplink. Each of the downlinks and uplinks comprises multiple physical communication channels including multiple control/signaling channels and multiple traffic channels. BBU 201 is coupled to each of the multiple RRUs 202-205 by a corresponding backhaul link 212-215, for example, a wireless link or a wired link such as a fiber optic network. Typically the scheduler resides with a BBU. In still other embodiments, communication system may comprise system that is a combination of the embodiments depicted in FIGS. 1 and 2.

TPs may be co-located, in which case it is feasible to connect them to a single eNB. An example is the typical three-sector deployment with a single eNB controls three service areas referred to as sectors/cells. TPs may be geographically separated, hence the term "remote radio units" or RRUs, or "remote radio heads" or RRHs. An example of geographically separated TPs is see in the deployment scenario of heterogeneous network that is comprised of different types of eNBs with varying transmission powers.

Figure 3:
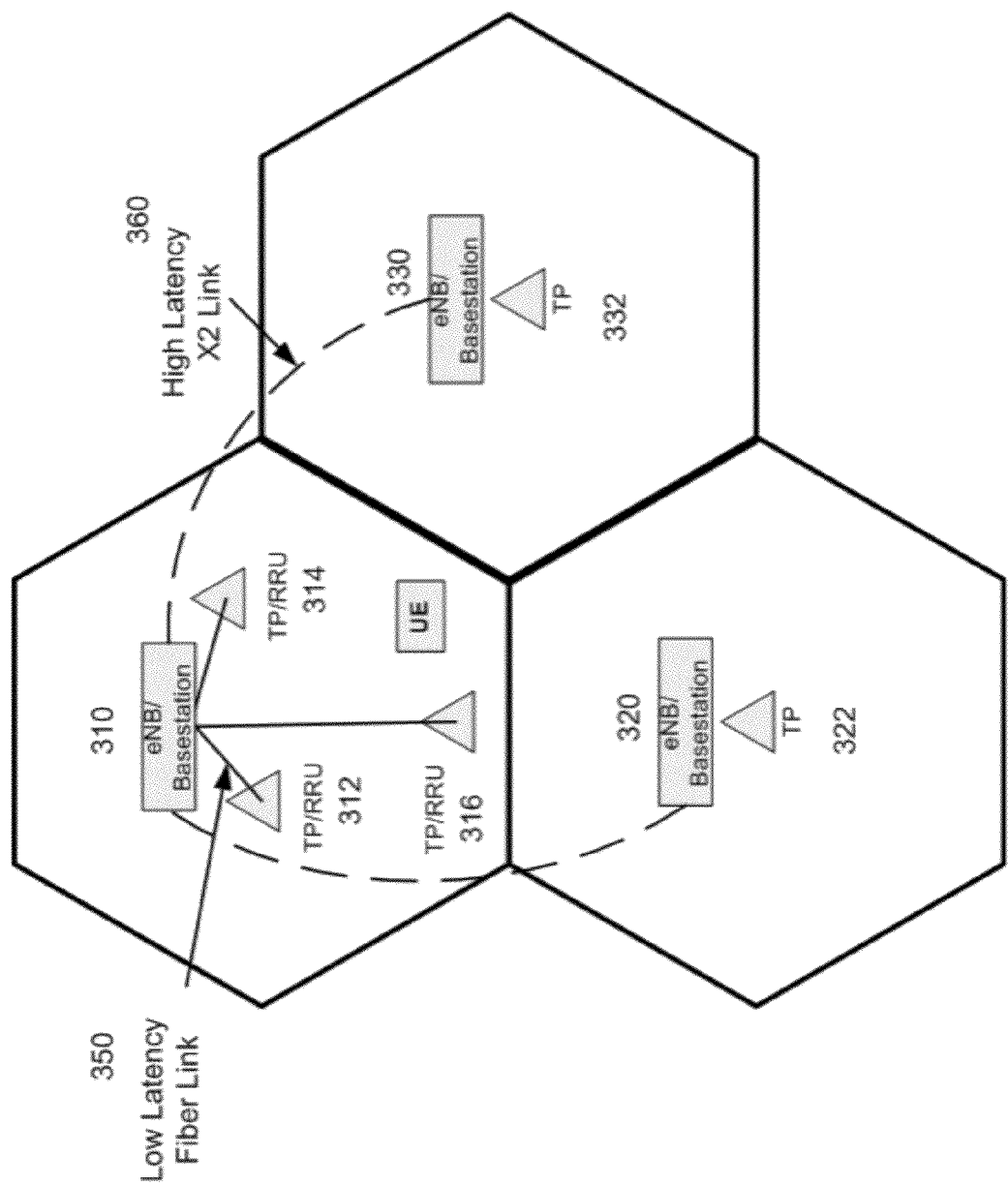
FIG. 3 is a diagram of a wireless communication network.

FIG. 3 depicts an exemplary wireless communication network with multiple eNBs or BS units 310, 320, 330. Further each base station unit is connected to one or more transmission points TPs or RRUs which may be configured as individual cells. Base station 310 is connected to RRUs 312, 314, 316; base station 320 is connected to RRU 322 and base station 330 is connected to RRU 332. Further in this example, base station 310 is connected to RRUs 312,314,316 through low latency backhaul link 350 (e.g., fiber based), which enables fast centralized coordination among these TPs by the base station 310. On the other hand, coordination between TPs controlled by different base station, like 312 and 332, would require use of high latency X2 connection 360.

Figure 4:
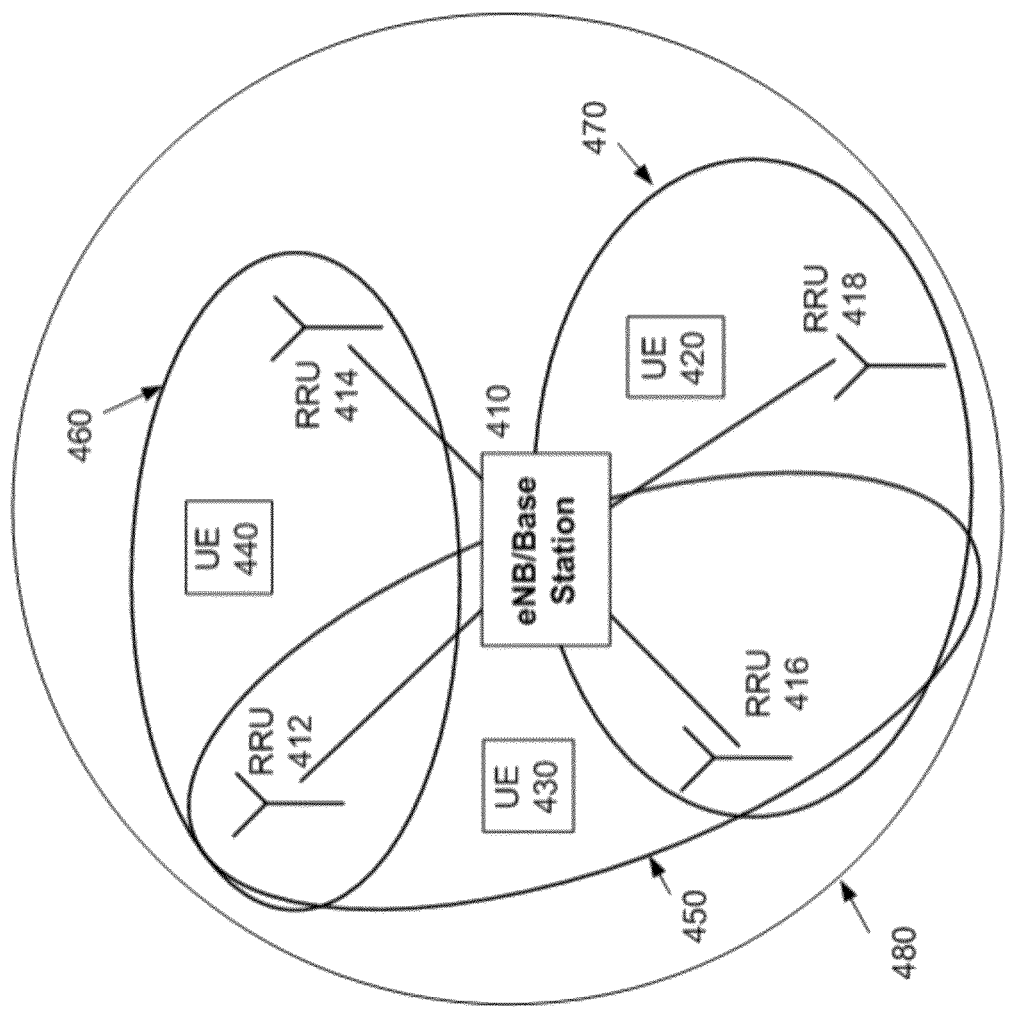
FIG. 4 is a diagram of a wireless communication network.

FIG. 4 also depicts coordination of multiple RRUs 412, 414, 41, 418 by an eNB/base station that controls these RRUs. A UE may receive transmission from a single RRU or more than one RRU. Only as an example here, assuming two RRUs jointly serve a coverage area, three approximate areas are illustrated as 450, 460, 470, corresponding to three RRU pairs (412,416), (412,414) and (416,418), respectively. UE 430 is located in the coverage area 460 served by RRU pair (412, 416) and could receive joint transmissions from these two RRUs. In this case, 412 and 416 may be referred to as serving RRUs and 418 as a non-serving RRU (or potentially interfering RRU), all from UE 430's perspective only. Similarly UE 440 may receive transmissions from 412 and 414. UE 420 may receive transmission from 416 and 418. But UE 420 may be closer to 418 and thus the central scheduler may decide to use only RRU 418 to serve UE 420. eNB/base station may determine the serving and non-serving RRUs for each UE considering the performance of the whole network 480 in its control, based on some UE feedback measurements. Such determinations may be semi-static or dynamic.

Referring now to FIG. 5 and FIG. 6, block diagrams are provided of a UE 500, such as UEs 101-103, and a BS 600, such as BSs 110-113 and 200. Each of UE 500 and BS 600 includes a respective signal processing unit 502, 602, such as one or more micro-signal processing units, microcontrollers, digital signal processing units (DSPs), combinations thereof or such other devices known to those having ordinary skill in the art. The particular operations/functions of signal processing units 502 and 602, and respectively thus of UE 500 and BS 600, are determined by an execution of software instructions and routines that are stored in a respective at least one memory device 504, 604 associated with the signal processing unit, such as random access memory (RAM), dynamic random access memory (DRAM), and/or read only memory (ROM) or equivalents thereof, that store data and programs that may be executed by the corresponding signal processing unit.

Each of UE 500 and BS 600 further includes one or more corresponding transceivers 506, 606 coupled to the signal processing unit 502, 602 of the UE or BS. For example, BS 600 may include multiple transceivers, that is, a transceiver at each RRU 202-205. Each transceiver 506, 606 includes receiving circuitry (not shown) and transmitting circuitry (not shown) for receiving and transmitting signals over an air interface, such as air interfaces 120-123 and 222-225. UE 500 includes one or more antennas 508 and, in the event the UE comprises multiple antennas, may support MIMO communications. BS 600 further includes one or more arrays 610 of antennas, for example, BS 600 may include multiple antenna arrays, that is, array at each RRU 202-205, which arrays each are in communication with a corresponding transceiver 506 and which arrays each comprises multiple antennas 612. By utilizing an antenna array to transmit signals to a UE located in a coverage area of the BS, such as a cell or sector serviced by the antenna array, the BS is able to utilize MIMO techniques for the transmission of the signals.

BS 600 further includes a weighter 608 in association with each transceiver of the one or more transceivers 606, such as a precoder or any other type of signal weighting function, that is in communication with signal processing unit 602 and that is interposed between a corresponding antenna array 610 and a corresponding transceiver 606. In another embodiment, weighter 608 may be implemented by signal processing unit 602. Weighter 608 weights signals applied to the multiple antennas 612 of a corresponding antenna array 610 based on channel state information (CSI) feed back by a UE, for example, codebook feedback such as a codebook index and a rank index, statistical feedback such as a covariance matrix or any other type of matrix, eigenvectors, or channel quality mean and variance, a received signal quality information, a channel frequency response, or any other type of channel feedback known in the art, in order to predistort and beamform the signals for transmission to the UE over the downlink of the intervening air interface.

When weighter 608 comprises a precoder, each of UE 500 and BS 600 may further maintain, in at least one memory devices 504 and 604 and/or in precoder 608, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Indicator (PMI), for a group of resource elements (REs) where an RE is a time-frequency resource such as a 12 subcarriers in frequency by 7 OFDM symbols in time. In determining a precoding metric for a group of REs, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel.

The embodiments of the are implemented within UE 101-103 and BSs 110-113 and 200, and more particularly with or by software programs and instructions stored in the at least one memory devices 504, 604 and executed by signal processing units 502, 602 of the UEs and BSs. However, one of ordinary skill in the art realizes that the embodiments described herein may be also implemented in hardware, for example, integrated circuits (ICs), application specific integrated circuits (ASICs), and the like, such as ASICs implemented in one or more of UEs 101-103 and BSs 110-113 and 200. Based on the present disclosure, one skilled in the art will be readily capable of producing and implementing such software and/or hardware without undo experimentation.

In one implementation, the communication system comprises an Orthogonal Frequency Division Multiple Access (OFDMA) modulation scheme for transmitting data over air interface, wherein a frequency channel, or bandwidth, is split into multiple physical resource blocks (PRBs) during a given time period. Each physical resource block (PRB) comprises multiple orthogonal frequency sub-carriers over a given number of OFDM symbols, that are the physical layer channels over which traffic and signaling channels are transmitted in a TDM or TDM/FDM fashion. A PRB typically represents the minimum resource that can be assigned for transmission to a UE. A communication session may be assigned a PRB or a group of PRBs for an exchange of bearer information, thereby permitting multiple users to transmit simultaneously on the different non-overlapping PRBs such that each user's transmission is orthogonal to the other users' transmissions. A PRB also may be assigned to multiple users in which case the users are no longer orthogonal but they can be separated based on spatial signatures of the individual transmit weights.

In a more specific implementation, the communication system operates according to the 3GPP LTE standards, which specify wireless telecommunications system operating protocols including radio system parameters and call processing procedures, and implements coordinated multipoint transmission (CoMP). However, those who are of ordinary skill in the art will realize that the communication system may operate in accordance with any wireless telecommunication standard employing an Orthogonal Frequency Division Multiplexing (OFDM) modulation scheme, such as but not limited to other 3GPP communication systems employing channel estimation and feedback of channel interference measurements, a Third Generation Partnership Project 2 (3GPP2) Evolution communication system, for example, a Code Division Multiple Access (CDMA) 2000 1XEV-DV communication system, a Wireless Local Area Network (WLAN) communication system as described by the Institute of Electrical and Electronics Engineers (IEEE) 802.xx standards, for example, the 802.11a/HiperLAN2, 802.11g, or 802.20 standards, or a Worldwide Interoperability for Microwave Access (WiMAX) communication system that operates in accordance with the IEEE 802.16 standards, including 802.16e and 802.16m.

Among the signals being multiplexed and transmitted to a UE 101-103 from each of multiple coverage areas, such as by the multiple BSs 110-113 and/or by the multiple RRUs 202-205 associated with BS 200, are reference or pilot signals which may be multiplexed with control information and user data. Pilot signals, and more particularly Channel State Information-Reference Signals (CSI-RSs), are sent from antennas of a serving BS or RRU that may transmit to a UE in order for the UE to determine channel state information (CSI) that is fed back to a serving BS. Additionally, with respect to CoMP transmissions, the UE may need to determine CSI for multiple TPs or multiple BSs as well.

Figure 7:
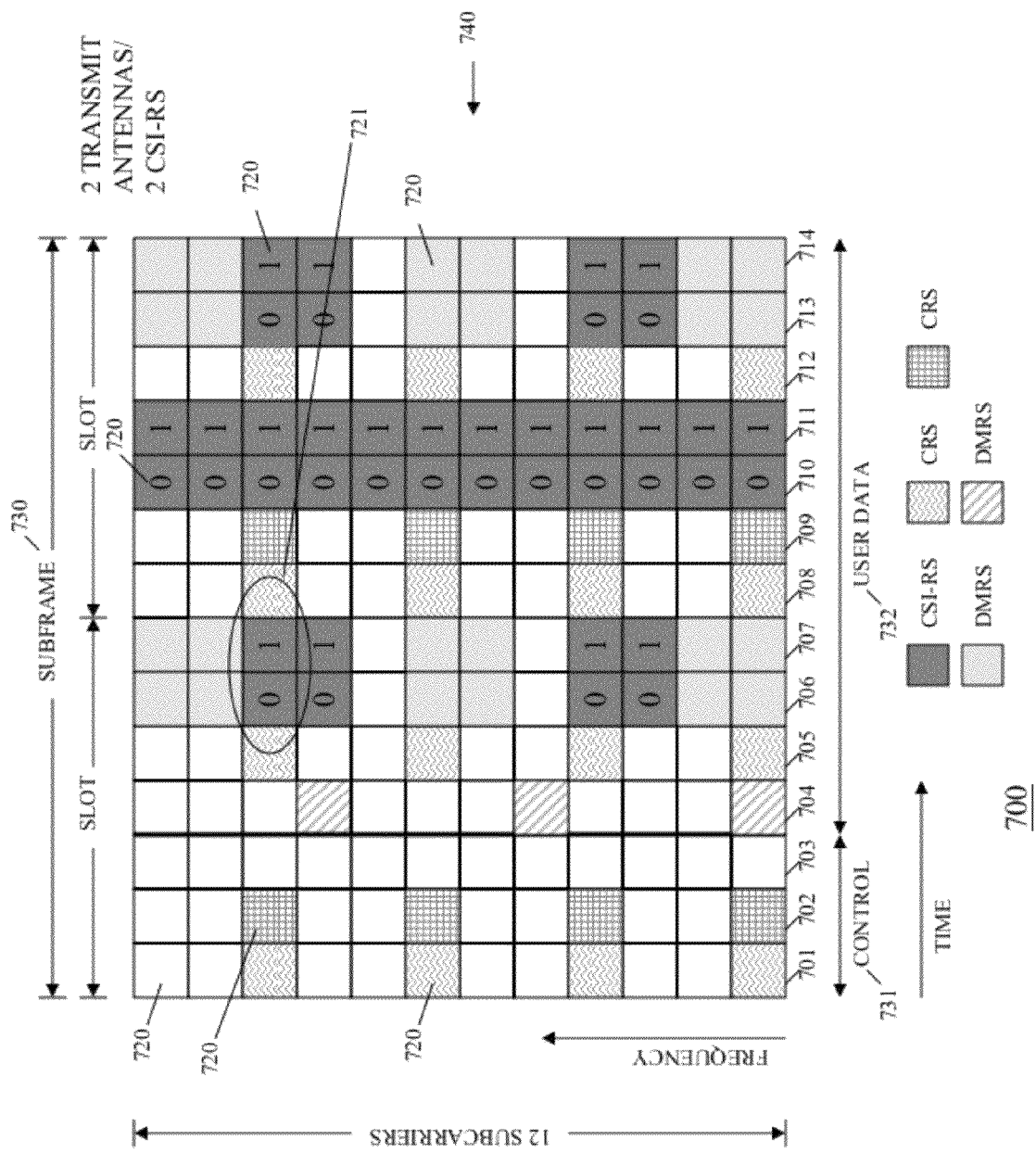
FIG. 7 is an exemplary time-frequency diagram of an OFDMA physical resource block (PRB) employed by the communication system of FIG. 1 and that illustrates pilot signal placement within the OFDMA PRB.

Referring now to FIG. 7, time-frequency diagrams 700, respectively are provided that depict exemplary distributions of pilot signals, and particularly CSI-Reference Signals (CSI-RSs), in a PRB 740 and over a subframe 730 that may be employed by a communication system in accordance with various embodiments of the disclosure. The terms 'pilot signals' and 'reference signals' are used interchangeably herein. A vertical scale of each time-frequency diagram depicts multiple blocks of frequency, or frequency bins, (frequency subcarriers) of the subframe that may be allocated. A horizontal scale of each time-frequency diagram depicts multiple blocks of time (in units of OFDM symbols 701-714) of the subframe that may be allocated. Subframe 730, depicted in time-frequency diagrams 700, comprises a physical resource block (PRB) 740, wherein the PRB comprises 12 OFDM subcarriers over two time slots comprising 14 OFDM symbols. In turn, PRB 740 is divided into multiple resource elements (REs) 720, wherein each RE is a single OFDM subcarrier, or frequency bin, on a single OFDM symbol. Further, PRB 740 comprises a control region 731, for the transmission of control data, and a user data region 732, for the transmission of user data.

In FIG. 7, PRB 740 depicts multiple allowable Channel State Information (CSI) reference signals, but typically only a subset of CSI reference signals (CSI-RS) will be used based on pilot configuration. A CSI reference signal configuration is used to refer to a set of resources (REs in an OFDM system) that may be used to transmit a set of CSI-RSs corresponding to a group of one or more transmit antennas, which can be referred to more generally as transmit antenna ports. In the Release 10 version of the 3GPP LTE specification, for a given number (or a group) of transmit antenna ports, multiple possible CSI-RS configurations are defined to choose from. In FIG. 7, CSI-RS are provisioned in groups of two transmit antenna ports. Each pair of ports, denoted as [0, 1], shared the same resources based on Code Division Multiplexing (CDM). In a particular example, a port pair [0, 1] shares the two corresponding resource elements (REs) 721 with a simple CDM code of [1, 1] and [1,−1]. In FIG. 7, there are total of 20 such CSI-RS pairs (each indicated by a pair of resource elements labeled as (0,1)) that can be employed by a network and a UE may have to measure all or some of them depending on eNB's request. Different CSI-RS can be used by different TPs to allow the UE to make measurements of channel between the UE and each TP. As an example, with each RRU supporting 2 transmit antennas each, a 2-port CSI-RS configuration can be assigned to each RRU and for a cluster of M RRUs controlled by an eNB, M such 2-port CSI-RS configurations can be assigned.

UEs need knowledge of CSI-RS for all the TPs (i.e., the time-frequency resources occupied by the TPs and the one or more sequences for the CSI-RS). Such configuration may be pre-defined or informed by an eNB. In one example, CSI-RS configuration may be derived from the cell ID(s) associated with the TPs. The RRUs may have separate cell-IDs or all share a single cell-ID. For example, if four RRUs are configured with a single cell-ID, then they can use a 8-port CSI-RS configuration corresponding to 8 transmit antennas with subset/group of 2 CSI-RS assigned to each RRU. In such an operation, a UE may or may not be aware of the CSI-RS groups and their association with RRUs. It may simply see them a multiple antenna ports. Various embodiments described herein apply to both these configurations, one where a RRU is clearly known by its cell-ID or simply corresponds to a group of one or more antenna ports configured to the UE as overall measurement setup.

In FIG. 7, PRB 740 also shows other (i.e., non-CSI-RS) pilot signals that are distributed in control region 731 and/or user data region 732 of the PRB. For example, the shaded REs of PRB 740 are reserved for, that is, allocated to, either a common reference signal (CRS, also known as cell-specific RS) or a dedicated reference signal (DRS, also known as user-specific RS). These other reference signals may be present but are not necessarily used for channel estimation or interference measurements by a UE in a 3GPP Release-10 LTE communication system.

In a CoMP operation, as briefly described before, one or more TPs that are connected to one or more eNBs may cooperatively transmit to a UE. Such cooperation may be performed broadly, but not limited to two approaches. One approach is a Joint Transmission (JT), where a set of TPs jointly transmit data symbols intended for a UE. Another approach is Coordinated Scheduling (CS), where neighbor TPs which transmit to a second UE and thus can potentially interfere with a first UE. Coordinated transmission from non-serving (but cooperating) TPs may remove or suppress interference to the first UE. In a typical operation, TPs that coordinate for a joint transmission may be most likely the TPs or RRUs associated with a central base station controller or an eNB. On the other hand coordinated beamforming could be from different eNBs. In general, however, from a UE perspective, the UE may be receiving signals corresponding to i) desired data symbols jointly transmitted from a set of TPs, ii) removed or suppressed interference from other TPs, and iii) the residual interference seen by a UE, which originated from non-coordinating TPs (which may be typically outside the control area of an eNB).

As briefly described before, performance improvements can be expected from fast coordinated scheduling (fast CS) where individual TPs respond to the traffic loading and user channel and interference condition dynamically with adaptive resource allocation, user selections, silencing and power management. In a fast CS operation, interference management is performed in the power and frequency domain, where individual RRU adjusts its transmission power setting on certain frequency resources (including silencing/muting as a special case) to reduce interference to other co-scheduled UEs (i.e., UEs occupying the same time-frequency resources). The reduced portion of transmission power may be reallocated to boost the transmission on other frequency resources as long as the total power constraint over the whole transmission bandwidth is satisfied at each TP.

Figure 8:
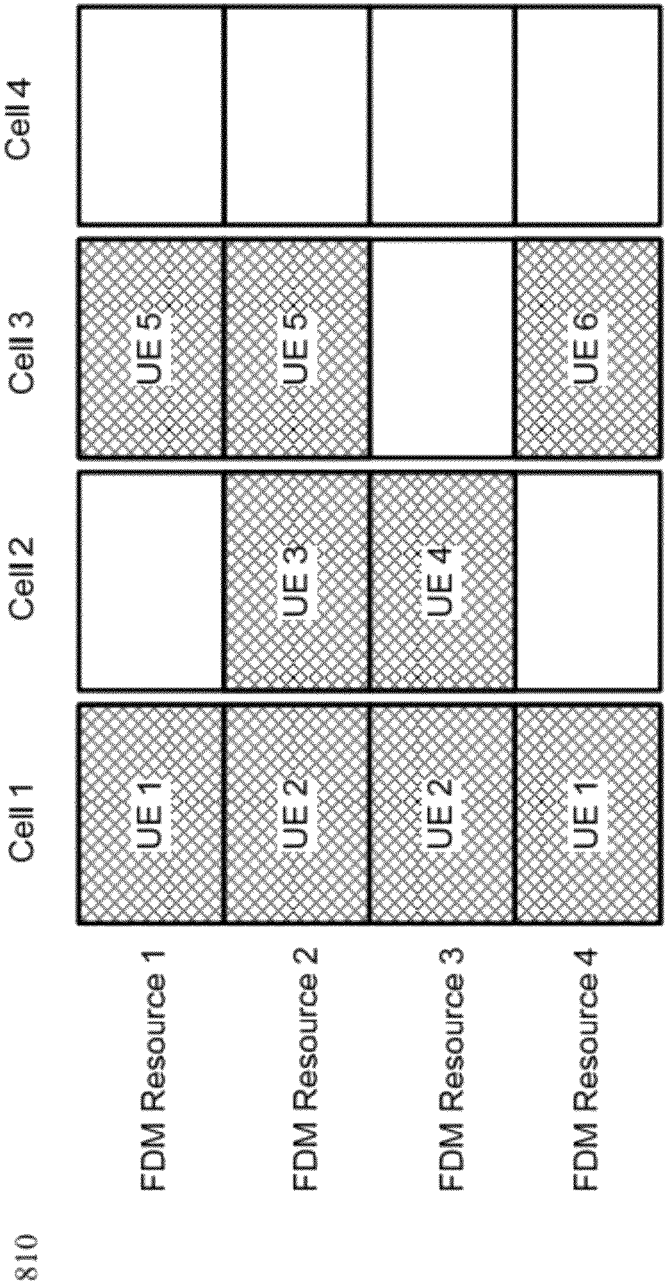
FIG. 8 is an exemplary snapshot of a fast coordination operation among multiple RRUs that share frequency resource partitions.

An example is illustrated in FIG. 8, which shows a snapshot of the fast mapping between frequency division multiplexing (FDM) resources/partitions and four coordinating cells, or more generically TPs. Each FDM resource or partition typically spans multiple OFDM subcarriers over a time duration (e.g., a subframe). In FIG. 8, UE 1 and UE 2 are assigned resources in cell 1, which transmits from all four FDM resource partitions. UE 1 sees significant interference from cell 2; hence cell 2 is muted/silenced on resources when cell 1 transmits to UE 1. Similarly, UE 4 sees significant interference from cell 3 who also mutes corresponding FDM resource 3. Cell 4 is muted on all resources, as it has significant interference to all UEs.

Fast CS may be compared with conventional fractional frequency reuse deployments in existing systems. As opposed to full frequency reuse or reuse-1 where all the cells can potentially transmit on all available frequency resources, cells in fractional frequency reuse are pre-assigned to a certain frequency portion. The network always operates under that fixed mapping or can only semi-statically adapts the resource partition, usually with very slow coordination across cells. Fast CS, on the other hand, coordinates the transmission frequency portion and the transmission power much more dynamically, possibly on a subframe basis in time. Fast CS can be facilitated by much improved coordination capabilities in a centralized scheduler which takes advantage of more active recommendations from the UE, and performs fast UE selection and transmission power adjustment to improve SNRs at the scheduled UEs. This in turn could lead to significant gains for cell-edge UEs, while also potentially improving or maintaining cell-average throughput. Clearly, an optimized operation of such system can be complex and implementation dependent at the eNB. One common goal in all implementations for an eNB scheduler, is to optimally assign available resources which include time/frequency resources of each TP among all the UEs served by that eNB. Such optimization is based on the maximization of a "sum rate" or an appropriately defined "proportional rate", which takes into account weighted Quality of Service (QOS) requirements or fairness criteria in the system.

To illustrate the optimization problem, assuming a cluster of M RRUs controlled by an eNB with a total of K UEs in the serving area. We start with the simple scenario where each UE may be served by a single RRU. A rate metric for the entire system can be expressed as follows.

$$\sum_{u \in U} R(S_u, I_u, I_o) = \sum_{u=1}^{K} R\left(\frac{\|H_u\|^2}{\sum_{i \in I_u} \|H_i\|^2 + I_o}\right)$$

In the above expression, the individual user rate metric is clearly a function of the channel and interference seen at the UE. The network rate is the sum rate of the UE set U representing the K UEs selected for transmission at any given subframe, $I_u$ is the TPs not serving user-u but other UEs (which we refer to as non-serving TPs) and $I_o$ is the interference observed from outside the cluster of TPs or RRUs controlled by the eNB. $H_u$ is the channel observed from the serving TP $S_u$ based on the received pilot signals (e.g., CSI-RS) that are sent at a certain (reference) transmission power. The received signal power at a UE can be expressed as a 2-norm of the channel matrix $H_u$. Individual user rate here is simply expressed as a function of the received signal to noise ratio (SNR).

More generally, the received signal power could take into account additional transmission parameters like transmit precoding from the serving TP. In this case the rate metric can be expressed more generally as a function of the channel and the total interference.

$$\sum_{u \in U} R(S_u, I_u, I_o) = \sum_{u=1}^{K} R\left(H_u F_u, \sum_{i \in I_u} \|H_i\|^2 + I_o\right)$$

where $F_u$ is the precoding matrix used for transmission. If any transmission power setting or scaling with respect to the transmission power of CSI-RS is applied to the traffic data transmission at one or more RRUs, the rate metrics can be modified as below:

$$\sum_{u \in U} R(S_u, I_u, I_o, \vec{\rho}) = \sum_{u=1}^{K} R\left(\rho_s H_u F_u, \sum_{i \in I_u} \rho_i \|H_i\|^2 + I_o\right),$$

where $\rho_s$ is the power setting at the serving TP and $\rho_i$, $i \in I_u$ are the power scaling factors applied at the non-serving TPs. The serving TP may and may not be able to change the transmission power of traffic data from the reference power of its pilot signals (i.e., $\rho_s=1$ if no change).

Instead of a single RRU, two or more RRUs out of the M RRUs can transmit to a same UE, which could further improve SNR and also achieve MIMO gains due to transmission from larger set of antennas. We again, for each UE-u, refer to the subset of RRUs $S_u$ whose transmissions are intended for UE-u as serving RRUs and the rest of RRUs $I_u$ as non-serving or potentially interfering RRUs. The above rate metrics can be readily extended to such a case, and power setting may also be adjusted on individual RRUs.

$$\sum_{u \in U} R(S_u, I_u, I_o, \vec{\rho}) = \sum_{u \in U} R\left(H(\rho(S_u), S_u) F_u, \sum_{i \in I_u} \rho_i \|H_i\|^2 + I_o\right),$$

where $H(\rho(S_u), S_u)$ is the concatenated channel matrix from all serving TPs after accounting for individual power scaling, if any. In the example of two selected RRUs, (say, m, n), it can be expanded as follows, where $H_m$ is channel from the m-th RRU which is of the dimension $N_r \times N_t$ with $N_r$ being the number of receive antennas at the UE and $N_t$ is the number of transmit antennas at the RRU.

$$H(\rho(S_u), S_u) = [H_m \rho_m H_n \rho_n], S_u = [m, n]$$

The problem of optimizing the sum rate requires the determination of many parameters simultaneously, including i) select UE set U; ii) a subset of serving RRU $S_u$ for each UE u; iii) a subset of non-serving RRUs for each UE u; iii) transmission power setting of each RRU $\rho_1, \ldots \rho_M$; and optionally iv) the transmission parameters of each RRU corresponding to such selections (where the transmission parameters could include precoding matrix, transmission rank). Furthermore, this optimization may also need to be performed for multiple frequency partitions jointly. The optimization of this metric is a scheduler implementation issue and often needs to resort to suboptimal approaches, which if designed carefully, may still achieve significant gains.

To enable any optimization at the centralized scheduler, one of the challenges at the eNB is the availability of achievable rate/throughput information at the UE under different transmission configuration that may be chosen by an eNB, where a transmission configuration is a generic term that refers to a state of transmission including the transmission scheme and corresponding parameters. In the present disclosure, a transmission configuration refers to particular selection of the serving and non-serving TPs, along with at least the power setting of the non-serving TPs. Additional transmission parameters include the PMI, RI, and CQI (referred to as Channel State Information or CSI) corresponding to a transmission configuration. Given that the number of valid transmission configurations can be very large, feedback of CSI corresponding to all the transmission hypotheses is clearly infeasible, due to significant computational complexity and high uplink/reverse link overhead.

In some cases, eNB may make some coarse predictions of the achievable rate at a UE for different transmission configuration. However with advanced receivers like interference cancellation, maximum likelihood decoding receivers for MIMO, improved channel estimations, any prediction may be very inaccurate. This problem is less significant in single cell non-CoMP systems, since the interference is somewhat clear and refinement based on some so-called "outer loop" adjustments can be helpful as long as the interference is stable. But for fast CS, whether a significant TP is acting as an interferer or a constructive coordinating source can mean a great deal to the achievable rate.

Allowing UE to make a recommendation of the preferred transmission configuration is a possible way to reduce feedback overhead. Once the transmission configuration is defined, the UE may, in theory, provide an accurate estimation of achievable rate based on the channel and interference condition prescribed by the transmission configuration and own implementation. However, in fast CS, feedback of achievable rate could become obsolete quickly as the transmission configuration changes dynamically. Feedback of CSI for multiple transmission configurations or more frequent feedback may be helpful. Moreover, even though UE is in a better position to accurately reflect its performance, eNB is in a better position to determine the total performance of a system, since it needs to consider recommendation from all UEs and any cost associated with a certain transmission configuration suggested by an individual UE.

Figure 9:
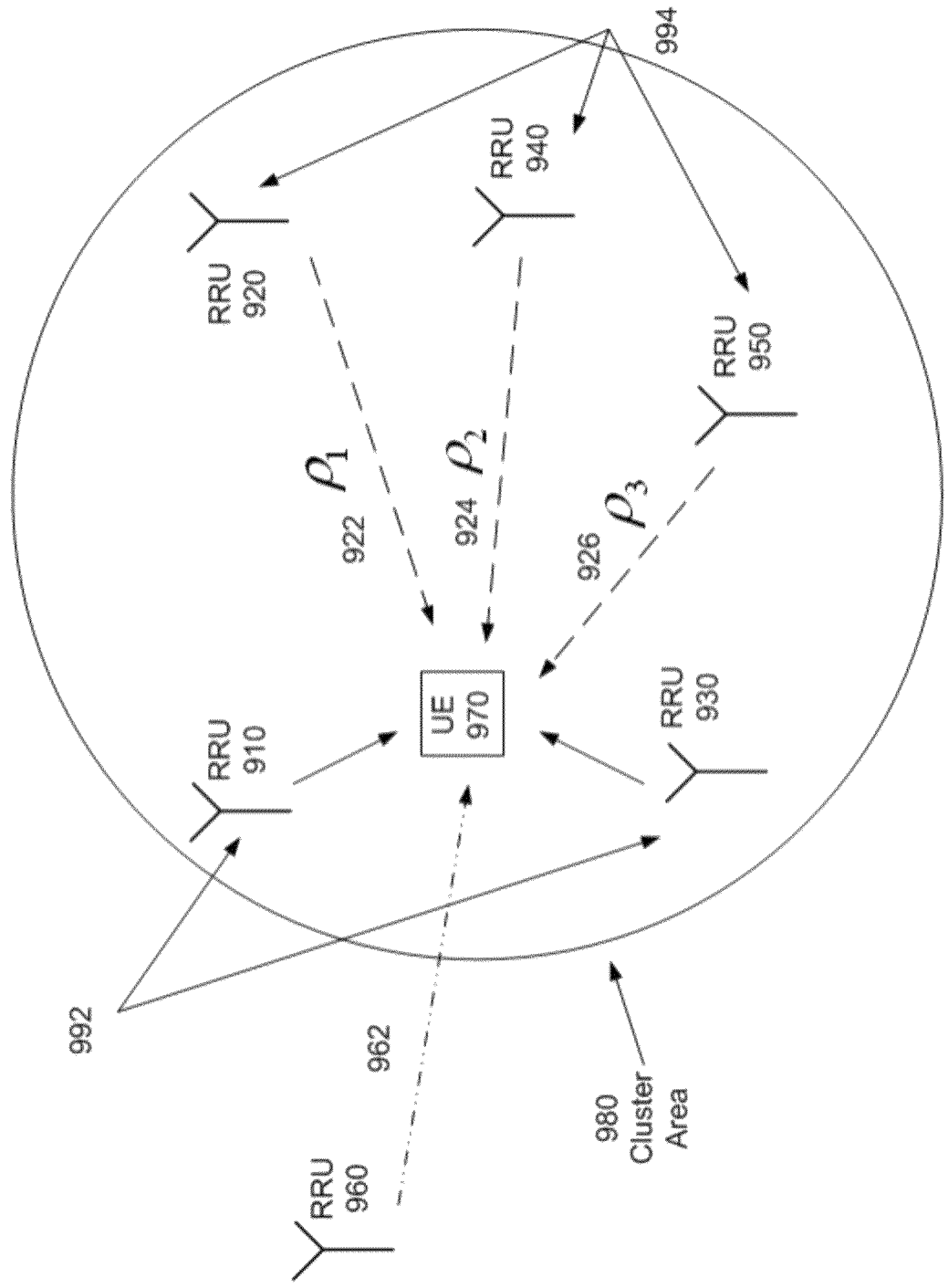
FIG. 9 is an exemplary diagram illustrating a transmission configuration in a fast coordinated scheduling operation.

FIG. 9 illustrates a preferred embodiment in a fast coordinated scheduling operation. UE 970 receives pilot signals from RRUs 910, 920, 930, 940, 950 which cover a cluster area 980 and may be controlled by an eNB. Also shown is RRU 960 outside of the cluster area that may be under the control of another eNB. UE 970 determines a first subset of RRUs 920, 940, 950 whose transmissions will not be intended for itself (dashed lines), i.e., non-serving or potentially interfering RRUs. The UE also determines a second subset 992 of RRUs 910 and 930 which the UE selects for transmission to self due to significant signals observed from them. UE 970 furthers determines a transmission power setting $\rho_1, \rho_2, \rho_3$ for each of the non-serving TPs the first subset. The information pertaining to the first and second subsets of TPs and the power setting of each of the first subset of TPs is then sent to the base-station as a recommendation.

Figure 10:
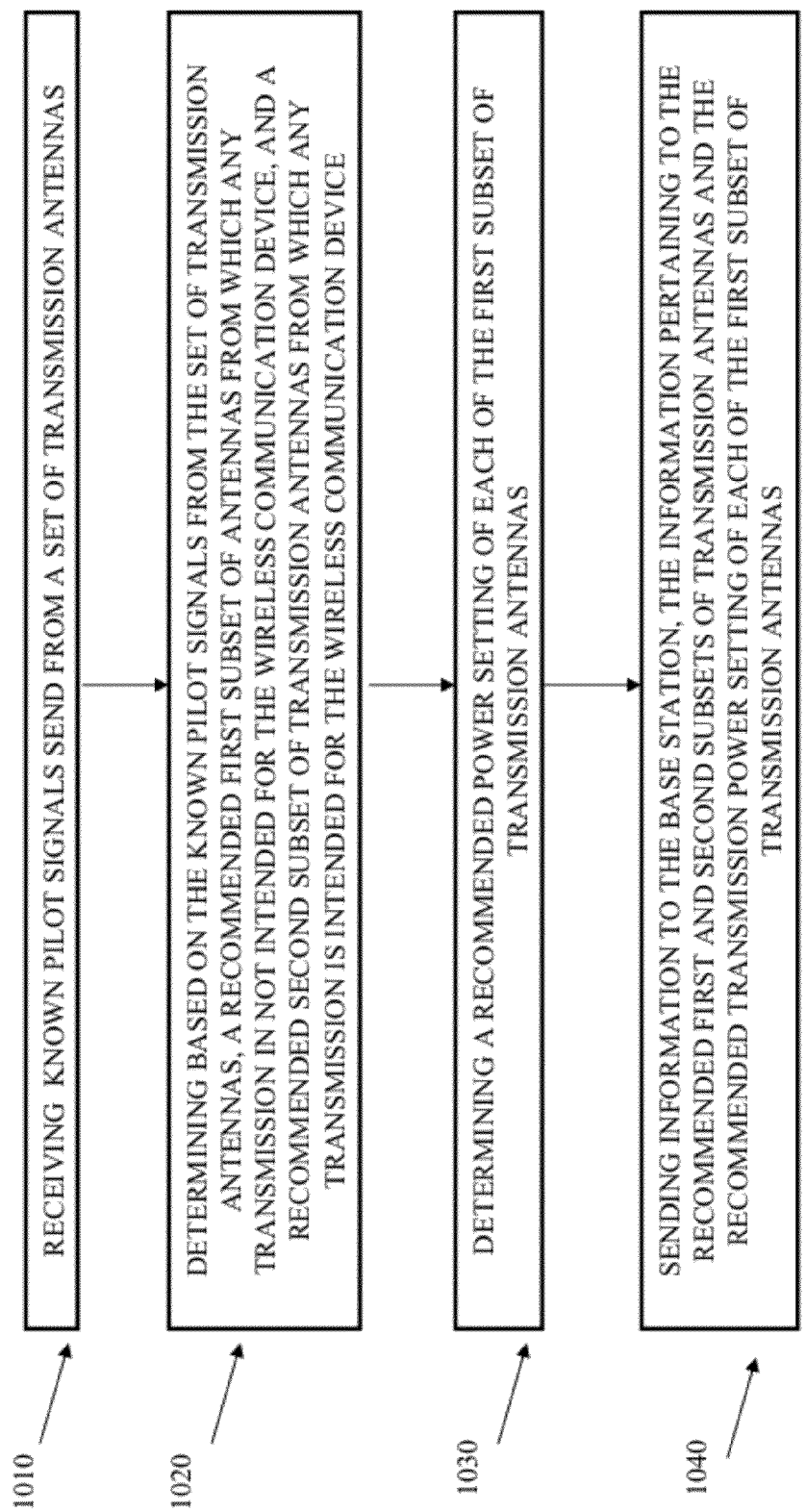
FIG. 10 is the flowchart of a method in a wireless communication device.

FIG. 10 is a flow chart describing a method in a UE to support fast CS operation. The method involves the step of 1010 where a UE receiving known pilot signals sent from a set of transmission antennas; determining in step 1020, based on the known pilot signals from the set of transmission antennas, a recommended first subset of transmission antennas from which transmissions are not intended for the wireless communication device, and a recommended second subset of transmission antennas from which transmissions are intended for the wireless communication device; determining in step 1030 a recommended transmission power setting of each of the first subset of transmission antennas; sending information to the base station in step 1040, the information pertaining to the recommended first and second subsets of transmission antennas and the recommended transmission power setting of each of the first subset of transmission antennas.

In one embodiment, the set of transmission antennas may belong to two or more geographically separated TPs or RRUs in CoMP, wherein the RRUs may share a single cell ID or use separate cell IDs. The first subset of transmission antennas may often correspond to the non-serving TP or RRUs among all the TP that the UE tracks, and the second subset of transmission antennas may often correspond to serving RRUs. The UE must have knowledge of the pilot signals for all the transmission antennas from all RRUs that the UE is required to track. Such knowledge could come from either an eNB (e.g., by notifying the cell IDs of all TPs) or are defined a priori. Pilot signals are associated with antenna ports. The UE may or may not know the mapping between antenna ports and physical RRUs.

In another embodiment, the UE determines the recommended first and second subsets of antennas and the transmit power setting of the first subset of antennas based on a pre-defined set of transmission configurations, each transmission configuration comprising a particular selection of the first and second subsets of antennas and a definition of the transmission power setting of each of the first subset of antennas. In this case, the information that UE sends to an eNB, pertaining to the recommended first and second subsets of transmission antennas and the transmission power setting of each of the first subset of transmission antennas, is represented as an index to the pre-defined set of transmission configurations.

In another embodiment, the UE determines the recommended first and second subset of antennas and the recommended transmission power setting of each the first subset of antennas, based on a set of transmission configurations that are configured by the eNB. The eNB may configure such transmission configurations for the whole cell (cell-specific) or differently to each UE (UE-specific).

In one embodiment, the recommended transmission power setting of the first subset of transmission antennas includes zero-power transmission from some or all of the transmission antennas in the first subset of transmission antennas (i.e., muting or silencing of non-serving TPs).

In another embodiment, the power setting may be defined relative to the reference transmission power level of certain reference symbols (i.e., the transmission power level at which the pilot signals are sent from a TP). Another exemplary approach is to define a Relative Transmit Power Setting as the Energy per Resource Element (EPRE) relative to the reference EPRE currently defined for a reference PDSCH transmission (physical data shared channel defined in 3GPP Release-8 LTE specification), as follows:

$$\text{Relative Transmission Power Setting } (n) = \frac{E(n)}{E_{ref,PDSCH}}$$

where n could be a reference resource like a subband or a PRB. $E_{ref,PDSCH}$ is usually the EPRE to be used for a reference PDSCH transmission and is further based on the EPRE of the reference symbols (e.g., CSI-RS) and a further known pre-defined offset. $E_{ref,PDSCH}$ is currently used as a reference by the UE for computing transmission parameters such as PMI, RI, and CQI (i.e., CSI) and typically represents the hypothesis of equal transmission power on all frequency resources (or RBs). The power setting defined as above, would correspond to a power back-off factor relative to this reference value. Similar definitions can be envisioned, as long as the reference is clear to the UE.

In one embodiment, the transmission configuration information may further include a recommended transmission power setting of each of the second subset of transmission antennas (i.e., antennas of the serving TPs), in addition to the power setting of each of the first subset (i.e., antennas of the non-serving TPs). The power setting may also be defined relative to a reference transmission power level such as that for the pilot signals.

If the relative power setting is quantized into a discrete set of values (e.g., 2 bits capturing 4 power levels including zero power or muting), the recommended power setting for the first subset of P transmission antennas can be represented by a bit pattern, such as in the form of $[b_{10}b_{11}, b_{20}b_{21}, b_{30}b_{31}, \ldots, b_{P0}b_{P1}]$ assuming each antenna has 4 power setting levels, where $b_{i0}b_{i1}$ or represents the power setting of antenna-i. The previous information pertaining to the first and second subsets of transmission antennas may also be represented as a bit pattern of length L where L is the total number of transmission antennas tracked by the UE. For example, a bit value "1" or "0" can simply represent whether an antenna port belong to the first or second subset. The two bit patterns may be combined to represent a transmission configuration. The above description on how to use a bit pattern to represent a transmission configuration is merely an example. More sophisticated bit patterns can be developed to represent all the transmission configurations more efficiently. For example, we can reduce from per-antenna indication to per-TP indication when a TP typically includes a set of transmission antennas. Another example is to jointly design the bit pattern to capture both the power setting information and selection information of the first and second subsets of antennas.

In fast CS, the UE sends the information of a recommended transmission configuration to the base station using a periodic or aperiodic uplink control channel. As opposed to a slow uplink channel, the more dynamic periodic or aperiodic uplink control ensures that the feedback occurs timely enough to enable fast CS. The feedback information may further include channel state information (CSI) corresponding to the recommended transmission configuration. As described previously, the channel state information is a generic term to represent additional channel related parameter to help the eNB to determine the actual transmission parameter under a corresponding transmission configuration. CSI typically includes precoding matrix indicator (PMI), transmission rank indicator (RI), and the corresponding channel quality indicator (CQI). Among CSI parameters, the CQI relates to the rate metric closely and in some cases, the CQI can be also used as a rate metric in rank-1 transmission. CQI is often the discrete MCS level that the UE can support for each data stream under a transmission configuration. An increasing CQI index corresponds to an improving link quality with an increasing rate metric. For the more general multi-stream transmission, the achievable rate can be approximated as the sum MPR (modulation product code-rate) of all the MIMO layers (i.e., transmission streams) or by the sum CQI of all the MIMO layers.

Transmission configuration recommendation may be reported less frequently compared to the corresponding CSI feedback. For example, in the case of using a periodic uplink control channel, a UE may recommend the transmission configuration once every $N_1$ subframes. The CSI parameters may be reported every $N_2$ ($<N_1$) subframes and are conditioned on the recommended transmission configuration. Similarly, the recommended transmission configuration may be reported for a frequency partition that is larger than the frequency resources for which the CSI is reported.

In another embodiment, a UE may report CSI parameters corresponding to more than one selected transmission configuration at different time instances/subframes. CSI corresponding to one transmission configuration may be reported every $N_1$ subframe and CSI corresponding to a second transmission configuration may be reported every $N_2$ subframes.

In another embodiment, the UE determines the recommended first and second subsets of transmission antennas and the recommended transmit power setting of the first subset of transmission antennas from a pre-defined set of transmission configurations by comparing rate metrics derived for each transmission configuration of the pre-defined set of transmission configurations. Generally a rate metric is a function of the SNR and may be approximated as a CQI as described previously.

However, the UE's recommendation based on the maximization of a single-user rate metric may not always be the best choice from a network perspective. The network incurs different costs for different transmission configuration due to, for example in the case of TP muting, the fact that some time-frequency resources from some TPs cannot be used for any UE and hence represent a network capacity loss. If such loss of resource is not compensated by the increase in the rate metric, the recommendation of muting or power reduction may not be a good decision for system optimization. Methods are needed for the network to communicate such cost or the cost can be accounted for at the UE based on some pre-defined methods (known to both UE and the eNB). We will describe some examples below.

In a first approach, UE may feed back multiple CSI for multiple transmission configurations, where these transmission configurations may or may not all be fed back. As an example, UE computes CSI-1 based on no muting on any of the TPs and computes CSI-2 based on the assumption of muting only the dominant non-serving TPs. The two CSIs may be jointly encoded to reduce feedback overhead. One example of such joint encoding is differential encoding for CQIs, where for a given a first CQI1 a second CQI can be represented with a differential index value CQI2-CQI1. Such differential index may be limited to a smaller range than the complete CQI range. In addition, one of the CSIs may be fed back less frequently or with lower frequency granularity to reduce overhead. As an extension of this method, a UE may be requested to report progressively better CQIs, each based on muting of an additional dominant non-serving TP. As an example, an eNB may have five TPs. The UE measures CSI-1 assuming no muting of any non-serving TP, CSI-2 assuming muting of one dominant non-serving TP, CSI-3 assuming muting of two dominant non-serving TPs, and so on. Each of the CSIs may be differentially encoded with respect to CSI-1 or progressively. Further, the number of dominant non-serving TPs to be considered may be configured by the eNB (for example, as limiting to two TPs only) or to be limited by the UE based on some pre-defined or configured threshold. Such threshold could be the reference received power measured on a cell relative to the reference received power of the serving or strongest TP.

In a second approach, eNB may prefer the UE to only report one selected transmission configuration and the corresponding CSI, but in some way reflecting the cost to the network. For example, the UE compares rate metrics derived for each transmission configuration based on a rate adjustment that depends on the corresponding transmission configuration. The UE then recommends a single transmission configuration along with corresponding CSI parameters. For example, such down selection can be performed by comparison of a rate metric of the corresponding CSIs of one or more transmission configurations according to the following rule:

$R(CSI_1) > \delta\ R(CSI_2)$, recommend configuration #1 and send $CSI_1$, otherwise recommend configuration #2 and send $CSI_2$ based on a rate-compensation-offset $\delta$, where $R(CSI_i)$ is the rate metric with the corresponding reported CSI parameters of a transmission configuration i. As discussed previously, rate metric can be just based on CQI, which is the modulation and coding recommendation and can be defined as the MPR (modulation product code-rate).

The rate-compensation-offset $\delta$ intends to capture the benefit of one transmission configuration over the other in terms of system spectral efficiency. It may be a pre-defined offset or a pre-configured offset by higher layers. An example of a simple predefined offset is $\delta=0.5$, where the value 0.5 compensates for the cost of assigning twice the resources when two TPs (one can be muted) serve a UE. A factor of 0.5 on rate metric is simply to normalize the rate. The comparison could be further based on a rate metric under the condition of a fixed transmission rank or any other fixed CSI parameters, or based on the achieved rate after considering the full flexibility of all CSI parameters, for example, whether a higher rank can be supported for one of the transmission configuration.

In a general embodiment, rate-compensation-offset could be some predefined function of effective number of cells or antenna ports used for transmission. In determining an effective number of cells, muted cells may also be counted as utilized resource as above. To capture the network resource cost of transmission power setting, the rate-compensation-offset could also be a predefined function of power setting on coordinating TPs. Further, parameters relating to such a function can be configured by the eNB to reflect some of the network aspects. A simple function could be based on the effective total power offset applied to the second subset of transmission antennas whose transmissions are intended for the UE and the effective total power offset from the first subset of antenna whose transmissions are not intended for the UE. Such effective total power offset is the ratio of the total adjusted transmission power corresponding to the power offsets to the total reference power without power offsets.

In a third approach for deriving a recommendation, a UE may recommend the transmission configuration to satisfy certain rate threshold or a CSI threshold. For example, an eNB may request the recommendation meets a target CQI, where such target CQI could be configured by the eNB, which may be determined by the eNB to meet some QoS constraints. The UE may report the most efficient transmission configuration that meets the target and the corresponding CSI. Another approach is to define the target as a differential value with respect to the rate metric or CQI of a reference transmission configuration. As an example, the reference transmission configuration could be the case with full-power transmission from all TPs and the differential value could be based on certain minimum CQI improvement target to be met with respect to the CQI of the reference transmission configuration, i.e., $$CQI_1 > CQI_{ref} + \Delta_{CQI}$$

where $\Delta_{CQI}$ represents such an improvement (e.g., an increment of the CQI index).

On the other hand, there may be some schemes where an eNB comes up with some additional information based on the recommended transmission configuration. For example, an additional transmission configuration may be derived by the eNB, based on some long-term measurements made by the eNB. They may also be derived based on long-term measurements at the UE who feeds those measurements back to the eNB. As an example, the long-term measurements could be the reference received signal power or reference received SNR for an individual TP. The long-term measurements may also be derived by the eNB by setting up feedback based on per-TP CSI feedbacks. As described before, these measurements themselves may be too coarse to capture some of the UE implementation aspects. But they may be useful to reduce the number of transmission configurations.

In various embodiments described so far, interference reduction is mainly achieved from transmission power setting. Such methods are largely sufficient in systems with uncorrelated antennas like cross-polarized antenna deployments. If significant spatial components exist, for antennas designed for beamforming such as co-polarized antennas, the interference reduction may also be achieved in the spatial domain in addition to power domain. There are many ways to take advantage of the additional spatial domain, some of which will be described below.

In order for the UE to take into account the possible beamforming gain when UE computes a rate metric and recommends a transmission configuration, the UE needs the precoder information. However, the UE may not know what precoder may be used at the non-serving TPs. Some assumptions can be made at the UE as further described below.

In one method, a UE may simply assume that the interfering precoder is chosen to minimize interference contribution. It may use the precoder represented by a precoder matrix index (PMI) in a pre-defined codebook. Or the rate metric or CQI may simply be averaged over all the possible PMIs (or a subset thereof) in the codebook to reflect the average performance.

In another exemplary method, a CSI-1 (e.g., CQI-1, PMI-1, RI-1) is computed at a UE assuming single TP transmission from RRU-1 only and CSI-2 (e.g., CQI2, PMI2, RI2) is computed at the same UE assuming single TP transmission from RRU-2 only. The UE can compute another CSI-3 assuming RRU-1 is using the PMI-1, but considering that RRU-2 is an interferer and using a new PMI which has a predefined relationship to PMI-2. The motivation for this operation is to reflect a preferred coordinated beamforming operation. Since PMI-2 coarsely represents channel direction from RRU-2 to the UE, a PMI orthogonal to PMI-2 would be preferred by the UE in order to minimize the signal power received from RRU-2. Such an orthogonal PMI (or similar) can be pre-defined for each possible PMI-2 in the pre-defined codebook and known at the UE. In general, the UE may use such pre-defined/orthogonal PMIs as the preferred PMIs of interferers for computing CSI of a given transmission configurations. One or more of these PMIs may be optionally fed back to the eNB. With the report of such reference CQI that is computed based on a well-defined PMI, the eNB is in a better position to refine the MCS for actual transmission, in case a different PMI is used at the interfering RRU2.

In one preferred embodiment, a UE may compute and report multiple CSIs each of which may assume transmissions from single RRUs and at-least one assumes a transmission from multiple RRUs.

In the above embodiments, some preferred simple transmission configurations can be defined. One corresponds to the conventional case of a single serving RRU with other RRUs being considered as interfering RRUs. Another corresponds to the case of joint transmission from all RRUs. Another corresponds to transmission from a single RRU but all the other RRUs are muted. The UE may feedback the selection of one or more of the pre-defined transmission configurations along with their CSI. This could enable eNB to derive CSIs of other transmission configurations by interpolating between these CSIs or to figure out the best and worst performance that can be achieved.

The various methods described so far have been assuming the fast CS operation is for a single frequency band. In the case that there are multiple frequency bands as in the case of carrier aggregation or there are multiple sub-bands in a frequency band, the various methods herein can be extended. Some embodiments are described below. A carrier refers to a system bandwidth occupied by an OFDM signal. Carrier aggregation refers to the aggregation of multiple bandwidths for multiple OFDM signals. Aggregated carriers may be inter-band or intra-band, adjacent or non-adjacent. The set of aggregated carriers may be different at different TPs. Note that we will not differentiate the carrier aggregation and single carrier case, but rather use the term frequency bands to generically refer to either carriers or sub-bands.

In one embodiment, a UE can simply feed back the recommend transmission configuration for individual bands. In another embodiment, a UE selects a set of W preferred bands from a larger set of S bands which may represent all the bandwidth that the UE can receive simultaneously. In this case, band selection is performed together with transmission configuration recommendation. The band selection information may be part of the recommended transmission configuration. A UE can report a different set of W preferred bands for each of the transmission configurations. For example, the UE may report a first set of preferred bands assuming a first transmission configuration and a second set of bands assuming a second transmission configuration. The first and second transmission configurations may be signaled by the eNB or selected by the UE based on the various embodiments described previously.

In various embodiments described herein, a slow coordination may be super-imposed on the fast coordination described in various embodiments here. Slow or semi-static coordination schemes may be supported in the network, especially between multiple eNBs. In such case, eNBs may exchange and agree to a pre-defined time/frequency domain muting subframe pattern (or reduced transmission power patterns). Such a pattern may include definition of whether an eNB is muting (or reducing its power) on each given subframe. Clearly in such a case the interference from cells outside the cooperating cluster may vary from subframe to subframe. When a UE determines the recommendation transmission configuration, it may need to make the recommendation from a constrained subset of subframes. Hence, in one embodiment, the UE determines a first recommended transmission configuration for a first subframe pattern. UE determines a second transmission configuration for a second subframe pattern. A subframe pattern is a predefined but known subset of subframes on which the out-of-cluster interference may be similar.

In another embodiment, a UE may further report which subframe pattern it would prefer along with the recommended transmission configuration for that preferred subframe pattern. In yet another embodiment, the subframe pattern to be used by the UE when recommending a transmission configuration may be explicitly or implicitly known to the UE, as an example, based on the subframe pattern from which a feedback request was made.

Figure 11:
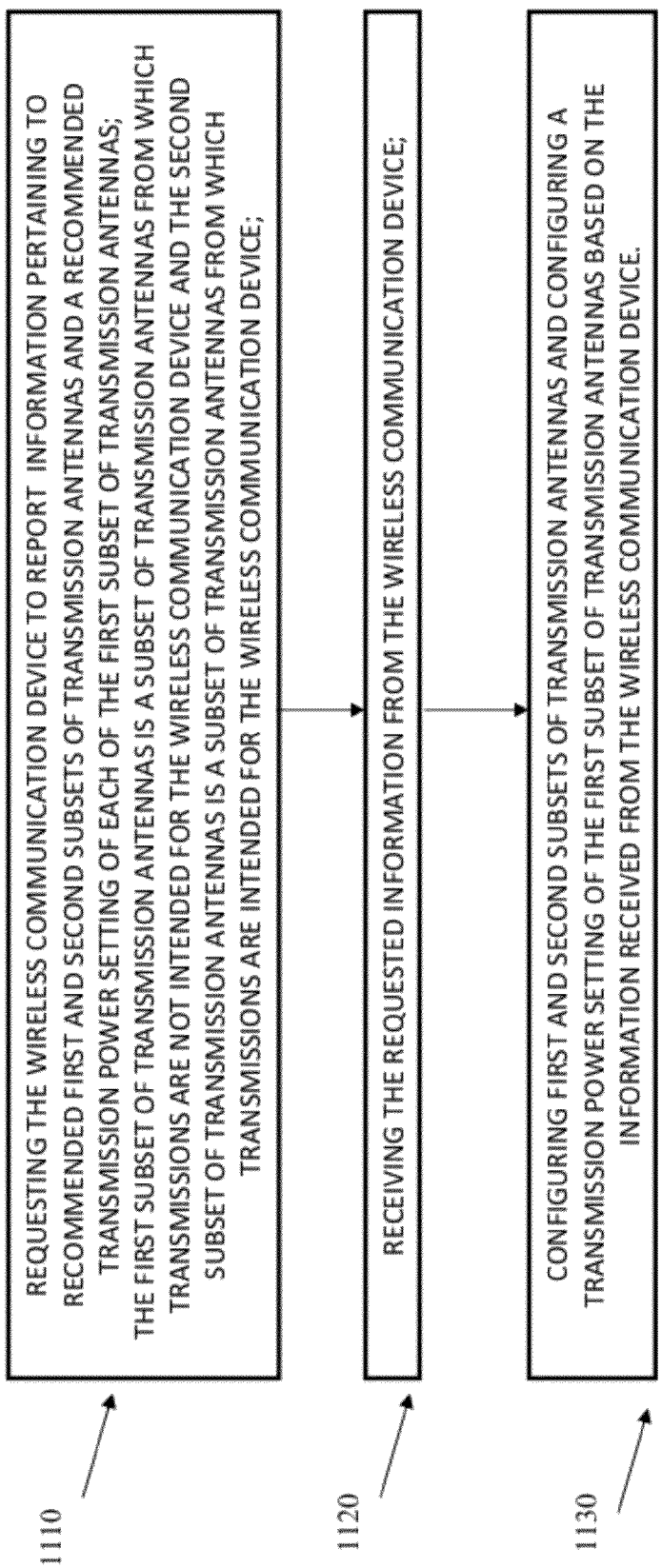
FIG. 11 is the flowchart of a method in a wireless infrastructure entity.

The description so far is mainly from the perspective of UE recommendation to enable fast CS. In another embodiment illustrated in a flow chart in FIG. 11, a method in a wireless communication infrastructure entity (e.g., an eNB) communicating with a wireless communication device is disclosed. At 1110), the wireless communication device is requested to report information pertaining to recommended first and second subsets of transmission antennas and a recommended transmission power setting of each of the first subset of transmission antennas, the first subset of transmission antennas is a subset of transmission antennas from which transmissions are not intended for the wireless communication device and the second subset of transmission antennas is a subset of transmission antennas from which transmissions are intended for the wireless communication device. At 1120, the eNB receives the requested information from the wireless communication device. At 1130, the eNB configures first and second subsets of transmission antennas and configures a transmission power setting of the first subset of transmission antennas based on the information received from the wireless communication device.

In some embodiments, the recommended transmission power setting received from the wireless communication device includes zero-power transmission. The eNB may, in some embodiments, also send to the wireless communication device a pre-defined set of transmission configurations, wherein each transmission configuration comprises a particular definition of the first and second subsets of transmission antennas and a definition of the transmission power setting of the first subset of antennas. In the above method, the eNB receives the requested information from the wireless communication device includes receiving an index to at least one of the pre-defined set of transmission configurations. In some embodiments, the eNB sends rate adjustment information to the wireless communication device, for use by the wireless communication device to derive rate metrics for determining the recommended first and second subsets of transmission antennas and the recommended transmit power setting of the first subset of transmission antennas.

An eNB may independently configure feedback reporting corresponding to each transmission configuration. As an example, the eNB may setup a periodic report for a first transmission configuration and another periodic report for a second transmission configuration. Typically, a periodic report as currently defined for LTE includes parameters like the periodicity for each of the individual reports in the CSI (like CQI/PMI/RI).

In another preferred embodiment, an eNB may request feedback corresponding to both joint transmission and coordinated beamforming, which could allow the eNB to set up a preferred CoMP transmission to a user. As an example, it may request one CSI feedback (CSI-1) for joint transmission from the two RRUs, such as the two most dominant RRUs to a UE. It may request a second feedback from the UE with transmission from RRU-1 only with RRU-2 being a coordinating non-serving RRU. The UE may recommend to mute RRU-2, or to have RRU2 transmit at a certain power level, or to have RRU2 use a PMI to mitigate any interference to the UE. The UE then feeds back CSI-2 based on these assumptions. The CSI-1 and CSI-2 would enable dynamic switching between joint transmission and coordinated beamforming modes at the eNB.

More generally, the eNB may send other information to influence the selection of a recommended transmission configuration at the UE. As examples, eNB may request a certain target CQI to be met or a certain preferred rank or a preferred PMI be supported. It may also indicate a certain preferred power budget to be met, where a power budget is defined based on total transmission power constraints on a first and/or a second subset of TPs. An UE may further perform the selection of transmission configuration based on the various embodiments described previously based on these further limitations or constraints.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device communicating to a base station, the method comprising:
receiving known pilot signals sent from a set of transmission antennas;
determining, based on the known pilot signals, a recommended first subset of transmission antennas from which transmissions are not intended for the wireless communication device, and a recommended second subset of transmission antennas from which transmissions are intended for the wireless communication device;
determining a recommended transmission power setting of each of the first subset of transmission antennas; and
sending information to the base station, the information pertaining to the recommended first and second subsets of transmission antennas and the recommended transmission power setting of each of the first subset of transmission antennas;
wherein the information pertaining to the recommended first and second subsets of transmission antennas and the recommended transmission power setting of each of the first subset of transmission antennas is represented as an index to a pre-defined set of transmission configurations, each transmission configuration comprising a particular selection of the first and second subsets of transmission antennas and a definition of the transmission power setting of each of the first subset of antennas; and
wherein the wireless communication device determines the recommended first and second subsets of transmission antennas and the recommended transmit power setting of each of the first subset of transmission antennas from a pre-defined set of transmission configurations by comparing rate metrics computed for each transmission configuration of the pre-defined set of transmission configurations.

2. The method of claim 1, wherein the recommended transmission power setting of each of the first subset of transmission antennas includes zero-power transmission.

3. The method of claim 1, wherein the set of transmission antennas belong to two or more geographically separated transmission points.

4. The method of claim 1, sending the information to the base station using a periodic or aperiodic uplink control channel.

5. The method of claim 1 wherein the wireless communication device compares rate metrics derived for each transmission configuration based on a rate adjustment specific to the corresponding transmission configuration.

6. The method of claim 1, further comprising
determining one or more recommended frequency bands associated with the recommended first and second subsets of transmission antennas and the recommended transmission power setting of each of the first subset of transmission antennas,
sending information to the base station, the information pertaining to the one or more recommended frequency bands, the recommended first and second subsets of transmission antennas, and the recommended transmission power setting of each of the first subset of transmission antennas.

7. The method of claim 1,
wherein the information pertaining to the recommended first and second subsets of transmission antennas and the recommended transmission power setting of each of the first subset of transmission antennas is represented as an index to a pre-defined set of transmission configurations,
each transmission configuration comprising a particular selection of the first and second subsets of transmission antennas and a definition of the transmission power setting of the first subset of transmission antennas,
wherein the information includes channel state information corresponding to the recommended transmission configuration.

8. The method of claim 7, wherein the information further includes channel state information corresponding to at least one additional known transmission configuration.

9. A method in a wireless communication infrastructure entity communicating with a wireless communication device, the method comprising:
  requesting the wireless communication device to report information pertaining to recommended first and second subsets of transmission antennas and a recommended transmission power setting of each of the first subset of transmission antennas, the first subset of transmission antennas is a subset of transmission antennas from which transmissions are not intended for the wireless communication device and the second subset of transmission antennas is a subset of transmission antennas from which transmissions are intended for the wireless communication device;
  receiving the requested information from the wireless communication device;
  configuring first and second subsets of transmission antennas and configuring a transmission power setting of each of the first subset of transmission antennas based on the information received from the wireless communication device; and
  sending to the wireless communication device information of a pre-defined set of transmission configurations, each transmission configuration comprising a particular selection of the first and second subsets of transmission antennas and a definition of the transmission power setting of each of the first subset of antennas.

10. The method of claim 9, wherein the recommended transmission power setting received from the wireless communication device includes zero-power transmission.

11. The method of claim 9, receiving the requested information from the wireless communication device includes receiving an index to at least one of the pre-defined set of transmission configurations.

12. The method of claim 9 further comprising sending rate adjustment information to the wireless communication device, for use by the wireless communication device to compute rate metrics for determining the recommended first and second subsets of transmission antennas and the recommended transmit power setting of each of the first subset of transmission antennas.

13. The method of claim 9, further comprising:
  sending to the wireless communication device information of a first pre-defined set of transmission configurations corresponding to a first frequency band, each transmission configuration comprising a particular selection of the first and second subsets of transmission antennas and a definition of the transmission power setting of the first subset of antennas;
  sending to the wireless communication device information of a second pre-defined set of transmission configurations corresponding to a second frequency band, each transmission configuration comprising a particular selection of the first and second subsets of transmission antennas and a definition of the transmission power setting of the first subset of antennas; and
  determining the frequency band for transmission based on the information received from the wireless communication device.

* * * * *